United States Patent
Sava et al.

(10) Patent No.: US 9,835,744 B2
(45) Date of Patent: Dec. 5, 2017

(54) VIRTUAL ELECTRODE CURRENT INJECTION USING SEISMIC FOCUSING AND SEISMOELECTRIC CONVERSION

(71) Applicant: Colorado School of Mines, Golden, CO (US)

(72) Inventors: Paul C. Sava, Littleton, CO (US); André Revil, Golden, CO (US)

(73) Assignee: Colorado School of Mines, Golden, CO (US)

(*) Notice: Subject to any disclaimer, the term of this patent is extended or adjusted under 35 U.S.C. 154(b) by 988 days.

(21) Appl. No.: 14/055,574

(22) Filed: Oct. 16, 2013

(65) Prior Publication Data

US 2014/0104980 A1    Apr. 17, 2014

Related U.S. Application Data

(60) Provisional application No. 61/714,704, filed on Oct. 16, 2012.

(51) Int. Cl.
  *G01V 1/02*  (2006.01)
  *G01V 11/00* (2006.01)
(52) U.S. Cl.
  CPC .............. *G01V 1/02* (2013.01); *G01V 11/007* (2013.01)
(58) Field of Classification Search
  USPC ......................................................... 702/14
  See application file for complete search history.

(56) References Cited

U.S. PATENT DOCUMENTS

| 6,147,497 A | 11/2000 | Berryman et al. |
| 6,943,553 B2 * | 9/2005 | Zimmermann .......... G01V 3/06 324/357 |
| 2002/0095275 A1 * | 7/2002 | Anzai ................. E04G 23/0218 703/1 |
| 2011/0025336 A1 | 2/2011 | Forgang et al. |
| 2011/0308789 A1 | 12/2011 | Zhang et al. |

(Continued)

OTHER PUBLICATIONS

Paul Sava and AndréRevil, Virtual electrode current injection using seismic focusing and seismoelectric conversion, Jul. 4, 2012, 5 pages.*

(Continued)

*Primary Examiner* — Tung Lau
(74) *Attorney, Agent, or Firm* — Sheridan Ross P.C.

(57) ABSTRACT

The present invention relates to acoustic wavefields produced using sources appropriately delayed in time and focused at known positions and times in a heterogeneous medium. Seismoelectric conversion occurs if the acoustic focus point coincides with a discontinuity in electrical and hydrological medium properties, thus generating a current density. The current generates a potential difference, which can be observed at a distance by an array of monitoring electrodes. Since the acoustic wavefield is precisely located at a position and time, this electrical source behaves like a controlled virtual electrode whose properties depend on the strength of the acoustic wavefield and on the medium properties. This procedure can be used to increase the robustness and resolutions of electrical resistivity tomography and to identify hydrological parameters at various points in the medium by scanning the medium by changing the position of the acoustic focus.

13 Claims, 10 Drawing Sheets

(56) References Cited

U.S. PATENT DOCUMENTS

2013/0066561 A1    3/2013    Thompson et al.
2013/0169279 A1    7/2013    Morys

OTHER PUBLICATIONS

S. Uyeda, Electric and magnetic phenomena observed before the volcano-seismic activity in 2000 in the Izu Island Region, Japan, May 28, 2002, p. 7352-7355.*

Zhu et al. "Seismoelectric measurements in rock samples and borehole models," International Journal of the JCRM, Jun. 2009, vol. 4, No. 2, pp. 71-77.

Zhu et al. "Crosshole Seismoelectric Measurements in Borehole Models With Fractures," Geophysics, Dec. 1998, vol. 21, No. 1, 9 pages.

* cited by examiner

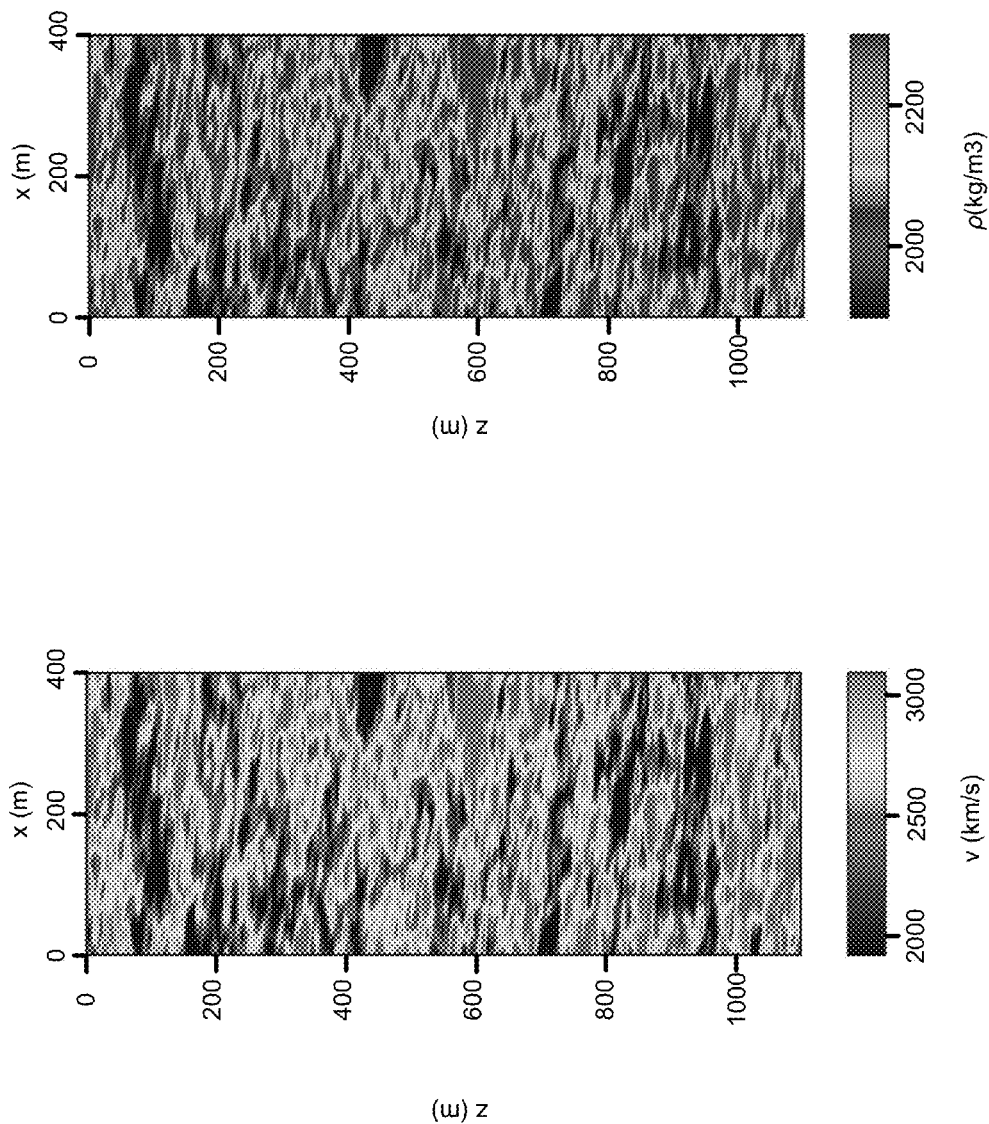

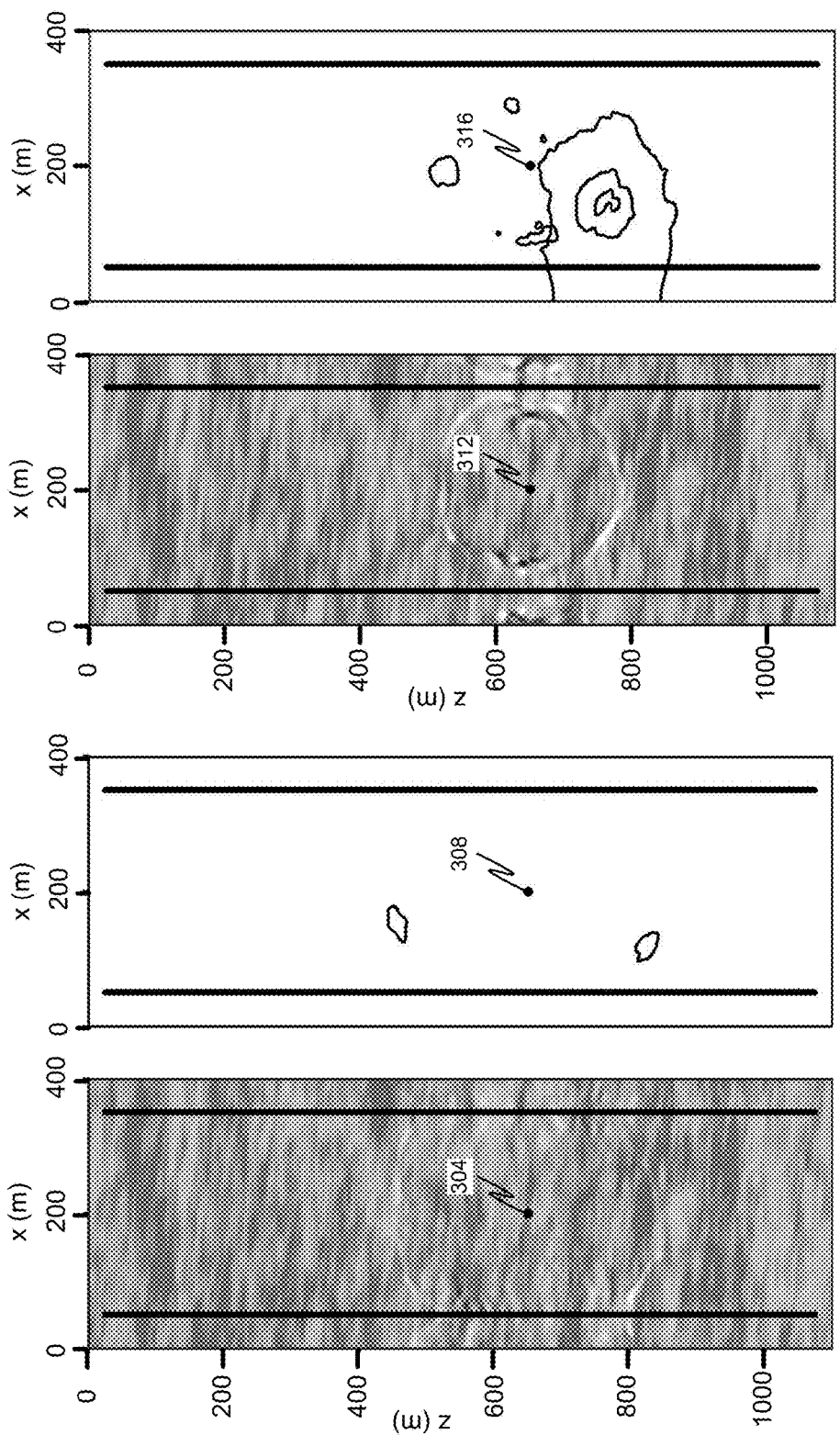

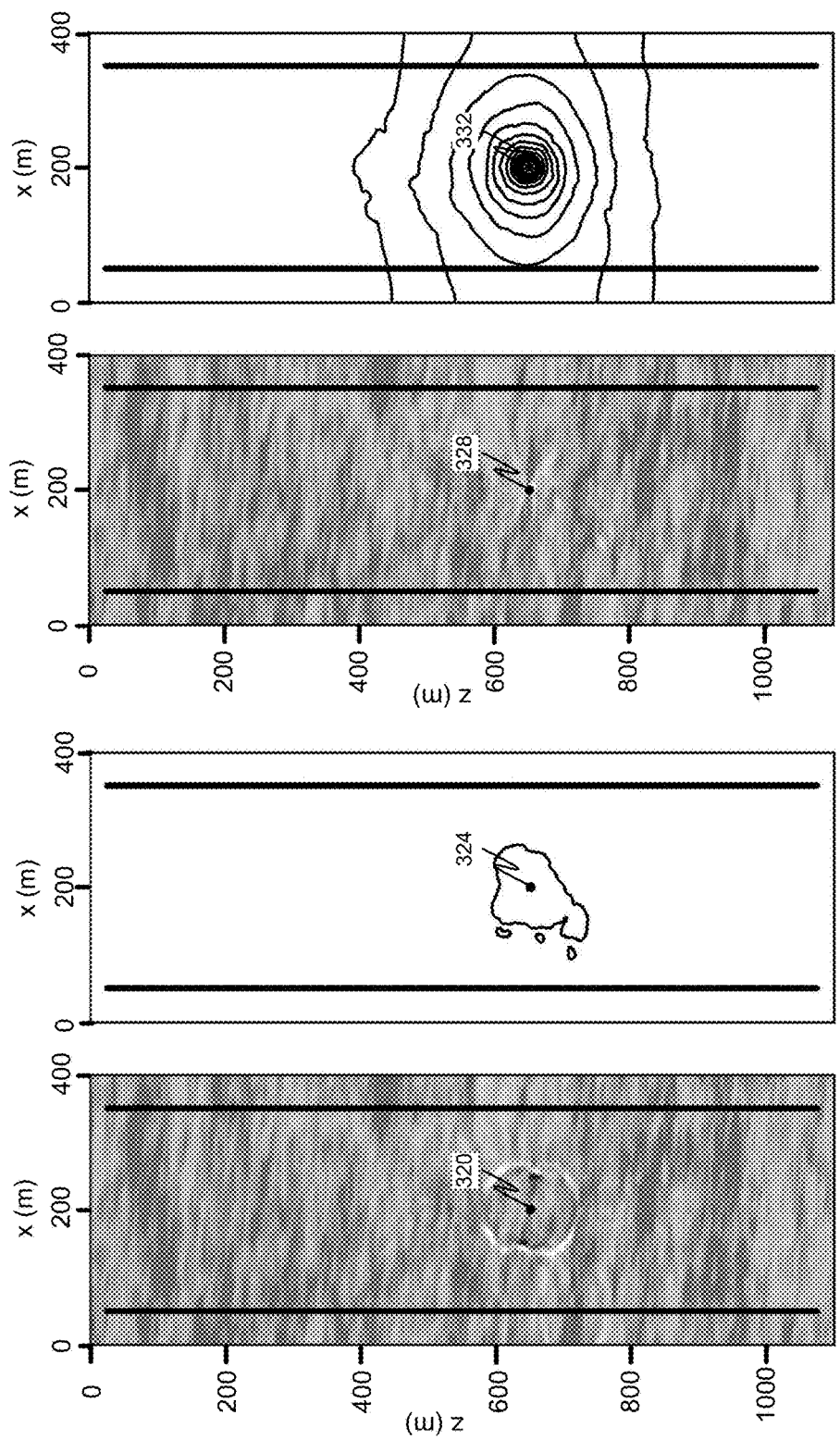

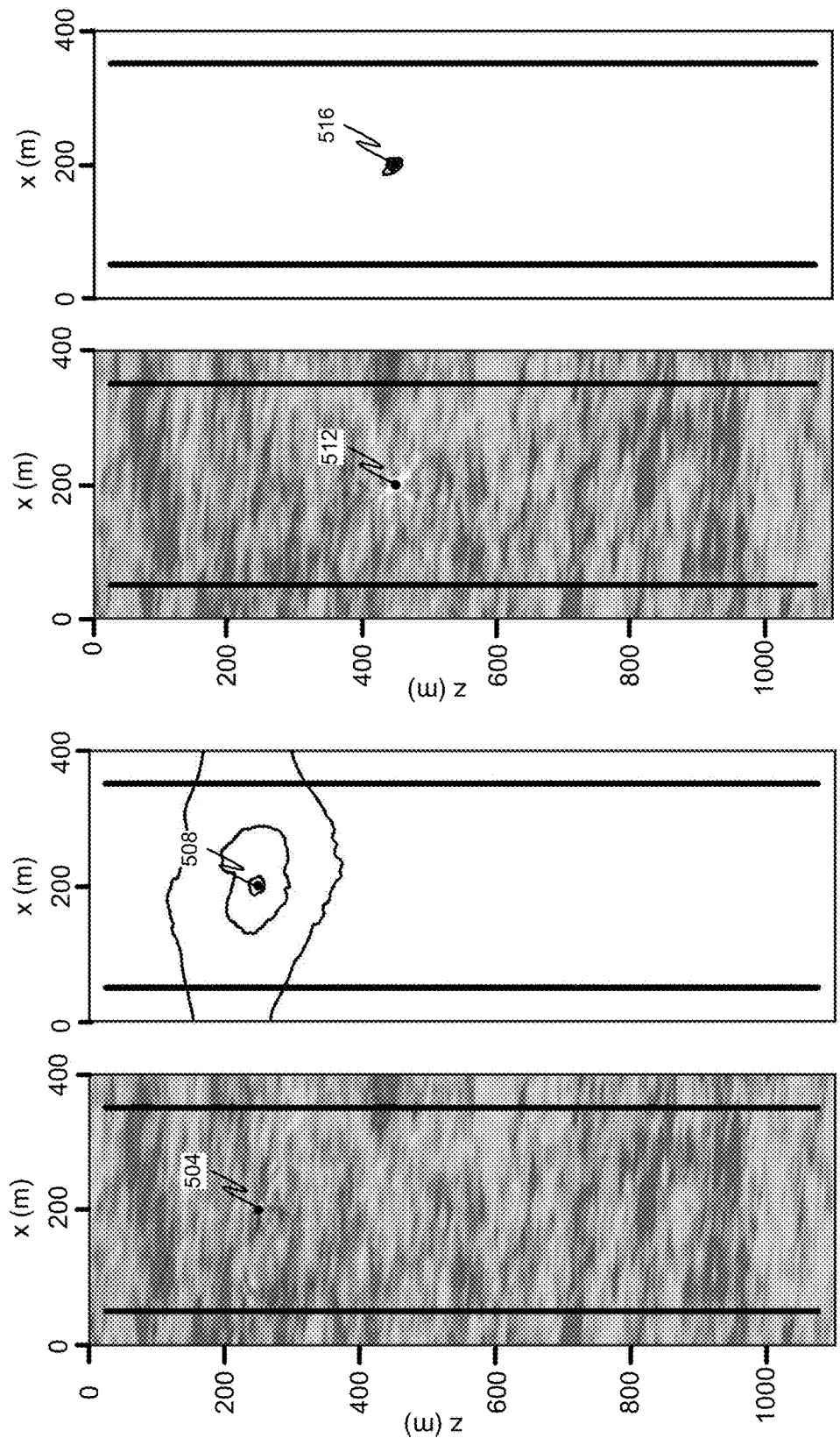

VIRTUAL ELECTRODE CURRENT INJECTION USING SEISMIC FOCUSING AND SEISMOELECTRIC CONVERSION

CROSS REFERENCE TO RELATED APPLICATIONS

This non-provisional patent application claims the benefit of priority from U.S. Provisional Patent Application No. 61/714,704 filed Oct. 16, 2012, the entire disclosure of which is hereby incorporated by reference in its entirety for all that it teaches and for all purposes.

FIELD OF THE INVENTION

The present disclosure is related to current injection electrodes used in characterizing electric/elastic phenomena in heterogeneous mediums.

BACKGROUND OF THE INVENTION

In non-destructive imaging, remote measures of different physical quantities are used at the exterior of an object in order to infer internal physical properties and their spatial distribution. In Geophysics, the object under investigation is the earth and the observations consist of measurements of the gravitational, magnetic, electric and/or elastic fields at the surface, in subsurface mines and/or in boreholes. The observations depend on the structure of the earth and are often the result of the interaction of a man-made perturbation on the medium. The main goal is to use these measurements to characterize the distribution of rocks and fluids in the interior of the earth. An approach to the challenge of imaging the interior of the earth is based on the simultaneous use of multiple geophysical fields with complementary sensitivity to a given structure. In particular, electric disturbances observed at the exterior of the earth may be caused by the passage of an elastic wave through a heterogeneous medium characterized by solid rock grains with pore spaces filled with different fluids (e.g., gas, oil, and water). The coupling between a seismic field and an electromagnetic disturbance is known as the seismoelectric effect, which has a long history in geophysics since the works of Ivanov in 1939 and Frenkel in 1944. The physics surrounding the seismoelectric effect is generally well understood, at least for the case of water-saturated rocks. The passage of an elastic wave through a heterogeneous medium causes movement of the fluids relative to the surrounding solid frame. This movement creates an electrical current due to the excess of electric charge contained in the pore water that is needed to balance the negative charge on the mineral surface. In turn, this current creates electromagnetic disturbances which can be observed with appropriate instrumentation at a distance.

The seismoelectric effect is sensitive to the presence of fluids in rock pores; thus, the seismoelectric effect provides a rare opportunity to characterize fluid saturation, rock permeability, and other phenomena that cannot be observed just with elastic waves. On the other hand, two main difficulties complicate the use of the seismoelectric effect in geophysical exploration and characterization. First, the seismoelectric effect is small, which limits its expression at a distance from the occurrence of a conversion of the mechanical-to-electrical signals. In general, it is estimated that the electric field disturbances can be observed up to a kilometer from the position of such a conversion. Second, seismoelectric conversions occur at any location where an elastic wave is present and at places where the medium solids and fluids are in direct contact. This limits the ability to associate an observed change in electric potential with a specific location in the subsurface.

Electrical resistivity tomography is generally used to identify and image electrical conductivity variations in the earth. These conductivity variations are then used to characterize the various properties of an area being observed. The classical way to do electrical resistivity tomography involves injecting an electrical current into the ground and measuring the resulting electrical potential received at a set of receiving electrodes. For example, an electrical current may be injected into the ground via electrodes in one borehole while the measured changes in electrical potential are observed in another, distant borehole. In other instances, an electrical current may be injected into the ground via surface electrodes and the change in electrical potential may be observed via distant surface receivers and/or borehole receivers.

One main drawback of this methodology is that the sensitivity is mainly localized to the vicinity of the electrodes, thus limiting the ability to image a wide area with high resolution. That is, to adjust the size or resolution of the area being imaged, the number and/or position of the electrodes would need to be adjusted. Adjusting the number and position of the electrodes may be cost and/or time prohibitive, especially when multiple boreholes may need to be obtained. Moreover, such additional boreholes may disturb the site being monitored both above and below surface.

SUMMARY

It is with respect to the above issues and other problems that the embodiments presented herein were contemplated. This disclosure provides, among other things, the ability to add additional information to electrical resistivity tomography by emulating a current injection electrode at any point in space. In at least one embodiment, the process described herein focuses seismic energy and utilizes an electrical current generated by an electrokinetic conversion. For example, seismic wavefields (e.g. acoustic wavefields) produced using sources appropriately delayed in time are focused at known positions in a heterogeneous medium. A seismoelectric conversion may then occur if the acoustic focus point coincides with a discontinuity in electrical and/or the hydrological medium properties (porosity, permeability, fluid properties, etc.), thus generating a current density. The generated current in turn generates a potential difference, or electrical field, which can be observed at a distance by an array of monitoring electrodes. For instance, the array of monitoring electrodes may remotely observe the generated electrical field at a distance of one kilometer. Of course, the array may be positioned closer to or farther from the actual acoustic focus point. Since the acoustic wavefield may be precisely located at a known position and known time, this electrical source behaves like a controlled virtual electrode whose properties are based on the strength of the acoustic wavefield and on the properties of the medium. Utilizing such a virtual electrode may be used to increase the robustness and resolutions of electrical resistivity tomography and/or used to identify hydrological parameters at various points in the medium by changing or otherwise altering the position of the acoustic focus point while scanning the medium.

In contrast to the classical electrical resistivity tomography often employed, by utilizing a synchronized array of seismic sources with different but known source functions, the electrical current injection site can be dynamically controlled and further adjusted, in both strength and time evolution, to image a desired area at a desired resolution. Thus, the resolution and robustness of electrical resistivity tomography may be increased and hydrological parameters at various points in a medium may be identified by changing the acoustic focus point of a seismic wavefield. Such a process may be implemented to monitor the evolution of a geological target, for example oil saturation during water flooding.

Moreover, in conventional methods, seismoelectric conversion occurs at all times and in all locations subjected to an acoustic or seismic source. By generating and controlling a virtual electrode through wavefield focusing, a virtual electrode source may be constructed having a known position and having a known activation time. Moreover, such a virtual electrode source can localize the seismoelectric conversion to one desired location. That is, embodiments of the present invention provide a system and method to observe the seismoelectric effect associated with a strong elastic wave localized at a single point in space, and at a given time. Embodiments of the present invention allow the observation of the strongest possible electric signal from a known location, assuming that the material properties at that location facilitate seismoelectric conversions, and also reduces the ambiguity caused by conversions occurring simultaneously at many points in the medium.

In some embodiments, multiple sources of elastic energy synchronized in space and time in order to focus all the elastic energy at a single target point. Focusing not only reduces the ambiguity of the seismoelectric conversion origin, but also ensures that the elastic wave causing the conversion is maximized since all energy induced into the medium is concentrated at only one point, instead of being distributed throughout the medium. Elastic wavefield focusing at a given point produces a localized electric source, i.e. a virtual electrode, which can be used to monitor the subsurface. For example, many sources of elastic energy can be activated at different locations in space at the same time. Waveforms injected into the medium with appropriate delays depending on the source position concentrate at the desired focus point and potentially trigger strong seismoelectric conversions. As another example, a single source of elastic energy can be used in the field, but activated multiple times at different positions in space. Then, the observed electric responses can be combined numerically based on timing that would be needed for the elastic energy to focus at a given location in the medium.

Accordingly, there are two main problems that can be solved utilizing virtual electrodes. First, assuming that the electric model parameters are known throughout the medium, e.g. the conductivity, the measured electric field can be used to infer the strength of the seismoelectric source. Since the magnitude of the elastic source responsible for the electric source is known, the source parameters related to the saturation and permeability at the focus source can be derived. This operation can be repeated by scanning the entire area of interest with virtual electrodes, thus producing a map of fluid properties with much higher resolution than that of any other technique available.

Second, assuming that the rock and fluid parameters in a given subsurface region, e.g., at a known reservoir, are known, the virtual electrodes can be triggered at many locations to derive the conductivity of the medium in the surrounding space. This procedure may dramatically improve the resolution obtained in conventional electric tomography for which the sensitivity is great only in the vicinity of the electrodes.

Further, virtual electrodes may be constructed using elastic sources timed to produce a strong pulse at a given time. Alternatively, or in addition, harmonic signals may be used to generate oscillatory virtual electrodes in the 10-200 Hz frequency band. Oscillatory sources in this band may be used to test for the type of fluid available in the reservoir using resonance which is present in oil-filled rocks and absent in water-filled rocks.

Virtual electrodes may also be used to monitor the production of oil and gas using time-lapse electric tomography. In developed oil and gas reservoirs, permanent installations of elastic sources and electric sensors may be constructed. This instrumentation may provide a means to track over time the movement of oil and gas in a producing reservoir. Accurate monitoring of reservoir fluids may aid reservoir development and optimize production.

Virtual electrodes can be used to monitor the presence of water in porous rocks (aquifers), which respond differently to elastic excitation from surrounding impermeable rocks (aquitards). Although water is present in both rocks, the aquifer water is free to move in the porous space, thus producing seismoelectric signals, in contrast with the bound water in the aquitards that do not produce seismoelectric signals. By scanning the near-surface with virtual electrodes distributed at many locations in the medium, the aquifer geometry may be mapped to optimize water use.

Virtual electrodes may also be used to monitor saline water intrusions in coastal areas. Salinity influences the transfer of energy between the seismic waves and the converted electric signal. Therefore, the position of salty water intrusion may be located and the change in salinity over time in known aquifers may also be monitored. The same can be done for contaminant plumes and to image the efficiency of pollution remediation.

In accordance with at least some embodiments of the present disclosure, a method for controlling a seismoelectric conversion is disclosed, the method comprising initiating a plurality of seismic waves from a seismic source, the plurality of seismic waves propagating through a medium; and focusing the plurality of seismic waves at a known location, wherein an intensity of the seismoelectric conversion occurring at the known location is greater than an intensity of the seismoelectric conversion occurring before and after the focusing.

In yet another embodiment, a method of providing an electric source in a medium si disclosed, the method comprising initiating a plurality of seismic waves from a seismic source, the plurality of seismic waves propagating through a medium; spatially focusing the plurality of seismic waves; and phase delaying the plurality of seismic waves such that the plurality of seismic waves propagating through the medium accumulate at a known location and at a known time; wherein an intensity of an observed electric potential resulting from a seismoelectric conversion occurring at the known location and at the known time is greater than an intensity of an electric potential resulting from a seismoelectric conversion occurring before and after the focusing.

In yet another embodiment, an apparatus for characterizing a medium of an earth formation, is provided, the apparatus comprising: a seismic source; a seismic sensor; and a virtual electrode source generator, wherein the virtual electrode source generator is configured to initiate a plurality of seismic waves from a seismic source such that the plurality of seismic waves propagate through the medium and focus at a known location, wherein an intensity of a seismoelectric conversion occurring at the known location is greater than an intensity of the seismoelectric conversion occurring before and after the focusing.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

FIGS. 2A-2D depict physical parameters characterizing a heterogeneous model in accordance with embodiments of the present disclosure;

FIGS. 3A-3D depict acoustic wavefields and electric potentials as a function of time and correspond to various times during wavefield focusing at a virtual source in accordance with embodiments of the present disclosure;

FIGS. 5A-5D depict acoustic wavefields and electric potentials as a function of space and correspond to various positions in the model characterized by different contrasts of physical properties in accordance with embodiments of the present disclosure;

DETAILED DESCRIPTION

The ensuing description provides embodiments only, and is not intended to limit the scope, applicability, or configuration of the claims. Rather, the ensuing description will provide those skilled in the art with an enabling description for implementing the embodiments; it being understood that various changes may be made in the function and arrangement of elements without departing from the spirit and scope of the appended claims.

Furthermore, while embodiments of the present disclosure will be described in connection with electrical resistivity tomography, it should be appreciated that embodiments of the present disclosure are not so limited. In particular, embodiments of the present disclosure may be applied to devices and imaging processes in which the electrical potential itself is utilized to provide one or more interpretations and/or make one or more observations regarding a heterogeneous medium. For example, embodiments of the present disclosure may include an electrode at the ground surface and/or in a borehole which records or otherwise receives an electrical potential each time the seismic energy is focused at a set of points located on a grid covering the subsurface. Based on the received electrical potential, an interpolated map of all the measured electrical potentials at each of the focus points (corrected for the distance between the scanning point and the position of the electrode) may be used to map heterogeneities. This approach may be utilized over time to image contrasts that would be associated with change in saturation only. Those skilled in the art will recognize that the disclosed techniques may be used in any application in which it is desirable to provide subsurface imaging an/or obtain characteristics of a geological target.

The exemplary systems and methods may also be described in relation to software (such as drivers), modules, and associated hardware. However, to avoid unnecessarily obscuring the present embodiments, the following description omits well-known structures, components and devices that may be shown in block diagram form, are well known, or are otherwise summarized.

In accordance with at least some embodiments of the present invention, an approach designed to add additional information to electrical resistivity tomography by emulating virtual current injection at any point of space through the focusing of seismic energy and electrical current generated by electrokinetic conversion is utilized. Since seismic waves propagating in an elastic medium may trigger a volumetric current density at places of discontinuity in electrical (e.g. conductivity) and hydraulic properties (e.g. permeability), this property is utilized to add the additional information to the electrical resistivity tomography.

Figure 1:
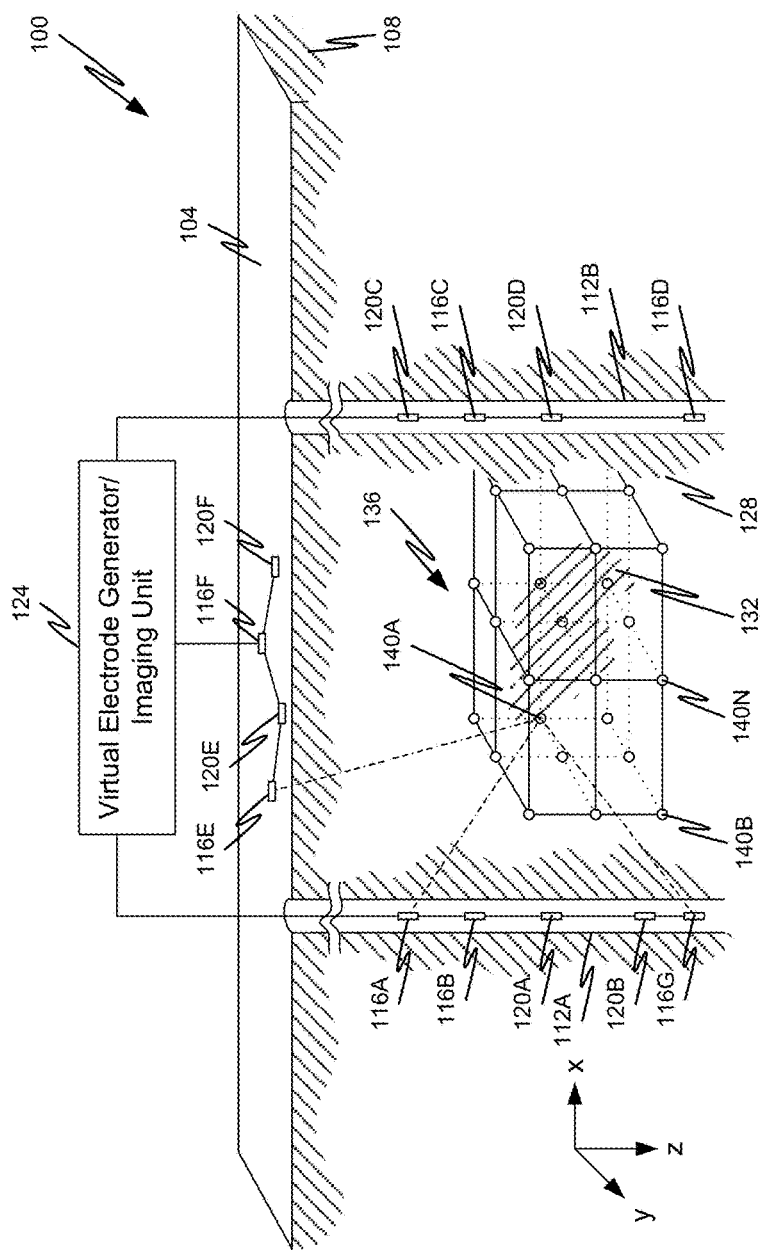
FIG. 1 depicts a system for controlling one or more virtual electrodes in accordance with embodiments of the present invention.

Referring initially to FIG. 1, details of a subsurface imaging system 100 are depicted in accordance with at least some embodiments of the present disclosure. The subsurface imaging system 100 generally includes one or more seismic sources 116A-G, one or more sensors 120A-F, and a virtual electrode generator/imaging unit 120. The one or more seismic sources 116A-G may include, but are not limited to, seismic vibrators, sledgehammers, air guns, plasma sound sources, thumper trucks, blasting caps, acoustic waves by one or more piezoelectric sources, ultrasonic transducers, other seismic sources capable of creating elastic waves that propagate in solid or fluid mediums, and combinations thereof. The one or more seismic sources 116A-G may comprise a synchronized array of seismic sources having different, but known, source functions. Alternatively, or in addition, and depending on the application as will be described later, individual point sources having a known seismic function may be used instead.

The one or more seismic sensors 120A-F may comprise any sensor, tool, and/or probe capable of measuring and/or converting a detected electrical potential resulting from a seismoelectric conversion. The one or more seismic sources 116A-G and the one or more sensors 120A-F may be positioned along a surface 104, in a subsurface area 108 utilizing one or more boreholes 112A-B, or combinations therefore. For example, and in some embodiments, the one or more seismic sources 116A-G and the one or more seismic sensors 120A-F may be positioned along a surface 104. Alternatively, or in addition, the one or more seismic sources 116A-G and the one or more seismic sensors 120A-F may be located below surface 104 in a subsurface area 108. Regardless of the location of the one or more seismic sources 116A-G and/or the seismic sensors 120A-F, the electrical current generated by an electrokinetic conversion is utilized as a virtual electrode; that is, the seismic energy is focused such that at a known location and a known time, a seismoelectric conversion occurs. The electric potential based on the current generated from the seismoelectric conversion is then detected and measured by the one or more seismic sensors 120A-F.

The one or more seismic sources 116A-G and the one or seismic sensors 120A-F may be connected to a virtual electrode generator/imaging unit 124. The virtual electrode generator/imaging unit 124 may be capable of providing an activation signal and/or a drive signal to the one or more seismic sources 116A-G. Alternatively, or in addition, the virtual electrode generator/imaging unit 124 may include the necessary signal conditioning and signal processing resources to acquire a signal representative of a detected electric potential from the one or more seismic sensors 120A-G, process and/or filter the received signal, and convert the signal into a visual representation, such as a map, illustrating one or more desired characteristics of the imaged area.

In accordance with embodiments of the present invention, and as previously discussed, seismoelectric conversions are utilized to detect/measure/observe one or more characteristics of a medium. Seismoelectric theory describes the coupling between seismic wave propagation and the generation of electromagnetic disturbances of an electrokinetic nature. The transfer function characterizing this phenomenon represents an extension of the electrokinetic theory in porous media and capillaries. The seismoelectric conversion occurs everywhere in the medium, but its largest intensity occurs at locations characterized by the highest gradient of material properties. For example, if large differences (e.g. large gradient) in material properties exist between the medium 128 and the medium 132, a large seismoelectric conversion, may occur. This volumetric current density, in turn, generates an electrical field through an electrokinetic coupling mechanisms and this electrical field may be remotely observed using an array of electrodes distributed in the medium to measure the resulting electric potential. For example, an array of seismic sensors 120A-G may be utilized to measure the electric potential and observe the generated electrical field. The electrical field can be used to invert the resistivity distribution through electrical resistivity tomography, and the seismoelectric conversion; that is, the volumetric current density can be used to characterize the petrophysical (mechanical, hydraulic, and electrical) properties of the area where the seismic source is focused.

Previously, only a small number of individual elastic sources and electrodes were employed for a seismoelectric survey, which limits the ability to characterize the medium with high resolution. The strength of the seismoelectric source depends on the intensity of the elastic field, which is variable in space and time. The strength of the observed electric potential depends on the conductivity of the medium, which is heterogeneous as a function of space. It is, therefore, difficult to unambiguously characterize the electric properties of the medium, for example, 108 and/or 128, throughout the space 132 under investigation, especially at the source, because the seismic wavefield spreads throughout the medium and low intensity electric signals are triggered everywhere in the medium.

Accordingly, and in accordance with at least some embodiments of the present disclosure, based on controlled sources 116A-G as a function of space and time, a synchronized array of seismic sources 116A-G having different, but known source functions may be used instead of individual point sources. The one or more seismic sources 116A-G may be appropriately phase delayed such that waves propagating through the medium 108, 128, 132 accumulate (i.e. focus) at known locations and at known times. At the time and location of accumulation, or focus time, seismoelectric conversion occurs mostly at the known focus location and with a much larger strength than compared with that of the seismoelectric conversion occurring throughout the medium both before and after such focusing occurs. In this way, "virtual electrodes" 140 can be utilized to inject energy into the medium at known times and locations, thus reducing the ambiguity posed by seismoelectric analysis in a heterogeneous medium. According, not only the position and time of the virtual electrodes at locations 140 can be controlled, but also their strength and time evolution.

As discussed in more detail, the strength of the observed seismoelectric potential depends not only on the acoustic field, but also on the (unknown) petrophysical properties at the source (e.g. at the one or more seismic sources 116A-G) including the (unknown) electric properties in the medium 108, 128, 132. Because identifying these properties can be accomplished through conventional seismoelectric inversion, electrical resistivity tomography is not discussed. Instead, at least one process for controlling virtual electrodes will be discussed such that the virtual electrodes may aid the seismoelectric conversion. Assumptions that (i) the elastic properties of the medium 108, 128, 132 are known with sufficient accuracy e.g. from wavefield tomography; and (ii) the process operates in the quasi-static regime of the Maxwell equations are made, although these assumptions are not a fundamental limitation of this technique.

The seismoelectric problem is usually formulated in terms of a coupling between the Maxwell equations and the Biot theory. For simplicity, the seismoelectric theory is adapted to make it compatible with the acoustic approximation, although the methodology is not limited to seismoelectric effects caused by acoustic wavefields. In the acoustic approximation, the pressure P corresponding to the hydrostatic component of the macroscopic stress tensor $\overline{\overline{T}}$ is obtained according to equation (1), $$P = -\frac{1}{3} tr(\overline{\overline{T}}) \tag{1}$$

where $tr(\overline{\overline{T}})$ represents the trace of then stress tensor. The pressure P may then evaluated directly by solving an acoustic wave-equation (2), e.g., $$\frac{\partial^2 P}{\partial t^2} - K\nabla \cdot \left(\frac{1}{\rho}\nabla P\right) = f(x,t), \tag{2}$$

where x and t denote space and time, respectively, K and $\rho$ represent the rock bulk modulus and density respectively, and $f$ represents the acoustic source. This formulation allows a pressure field to be simulated using an arbitrary source distribution as a function of space and time. For example, a typical band-limited point source at coordinates $x_0$ can be represented by $$f(x,t) = \delta(x-x_0)\omega(t), \tag{3}$$

where $\omega(t)$ is a wavelet confined to a certain frequency band. However, focusing at a given point in the medium $x_s$ from a distributed receiver array at coordinates $x_r$ can be achieved using time reversal with appropriately delayed sources injected at all receivers. For example, the source delays may be obtained by simulating the acoustic wavefield forward in time with a source at $x_s$ and observations at the receivers located at coordinates $x_r$, although this is not the only possibility.

For the seismoelectric problem, the pressure applied on the material needs to be related to a change in the pore fluid pressure. In the undrained regime of poroelasticity, the pressure P is related to the so-called undrained pore fluid pressure $p$ by $$p = BP, \tag{4}$$

where the Skempton coefficient $0 \le B \le 1$ is given by $$B = \frac{1 - K/K_u}{1 - K/K_s}, \tag{5}$$

where K is the bulk modulus, $K_u$ is the undrained bulk modulus, and $K_s$, represents the bulk modulus of the solid phase. The passage of the acoustic wave generates pressure fluctuations, which in turn change the pore fluid pressure and therefore lead to flow of the pore water according to Darcy's law:

$$u = -\frac{k}{\eta_w}\nabla p. \tag{6}$$

In this equation, u denotes the Darcy velocity (macroscopic volumetric flux of water), k is the permeability, and $\eta_w$ is the pore water dynamic viscosity (typically $10^{-3}$ Pa s). The excess charge in the pore water, which counterbalances the deficiency of charge of the mineral surface, is dragged by the pressure-induced flow of water, thus generating an electrical current density. The source current density associated with the pore water flow induced by the seismic wave is $$j_s = \hat{Q}_v u. \tag{7}$$

Substituting the expression (6) of the Darcy velocity yields $$j_s = -\hat{Q}_v \frac{k}{\eta_w}\nabla p, \tag{8}$$

where the quantity $\hat{Q}_v$ denotes the excess of charges contained in the pore water. To reduce the number of unknowns, the volumetric charge density may be obtained from the permeability itself using the empirical relationship $\log_{10}(\hat{Q}_v) = -9.23 - 0.82 \log_{10}(k)$. This charge density is due to the electrical diffuse layer coating the surface of the grains.

The total current density j is the sum of a conduction current density plus the source current density associated with the flow of the pore water $j_s$ $$j = \sigma E + j_s \tag{9}$$

where $E = -\nabla\Psi$ is the quasi-static electrical field, and $\sigma$ denotes the electrical conductivity of the porous rock. The quasi-static regime is a good approximation if the distance between the source and the receivers is typically smaller than 1 km. The quasi-static continuity equation, which corresponds to the charge conservation equation, is $$\nabla \cdot j = 0 \tag{10}$$

The volumetric source current density, caused by the passage of a wave through a heterogeneous material, is responsible for the radiation of electromagnetic energy. Therefore, under the quasi-static limit of the Maxwell equations, the electrical potential $\Psi$ is governed by the Poisson equation:

$$\nabla \cdot (\sigma\nabla\Psi) = \nabla \cdot j_s \tag{11}$$

This equation represents the PDE needed to solve in order to evaluate the electric potential $\Psi$ given by an electroacoustic source current $j_s$. The right-hand-side represents a source term for the electrostatic problem:

$$\nabla \cdot j_s = \nabla \cdot \left[\hat{Q}_v \frac{k}{\eta_w}\nabla BP\right], \tag{12}$$

where the pressure P is obtained by solving an acoustic wave-equation, e.g. equation 2. This relation shows explicitly how the heterogeneities in k and B generate radiative electrical fields that can be instantaneously measured at all the electrodes deployed in the medium.

Thus, seismoelectric virtual electrodes can be constructed at a given position in the medium by simulating an acoustic wavefield which focuses at desired coordinates (equation 2).

The pressure change at the focus point induces in the medium a current (equation 8), from which an electric source (equation 12) can be constructed, and the quasi-static electrical potential $\Psi(x)$ in the entire domain of investigation can be obtained. As indicated earlier, this electrical source occurs at a known time and position and has the largest amplitude relative to all other propagation times. The wavefield spatial and temporal localization enables the electrical source to be described as a controlled virtual electrode.

In accordance with at least some embodiments of the present disclosure, the generation of a virtual electrode may be illustrated according to the following examples. The following parameters may be assumed: (1) typical material properties characterizing a porous and permeable material (e.g. water saturated sand) and an impermeable material (e.g., water-saturated shale) may be provided by Table 1; and (2) two borehole seismic arrays are deployed in the medium, where the borehole arrays are sufficiently wide to facilitate energy focusing at various locations in the medium and at different times, and relatively shallow, such that the surface may be treated as an insulating boundary, and all other boundaries of the boreholes are conductive, thus simulating an unbounded volume.

TABLE 1

| parameter | unit | reservoir | non-reservoir |
| --- | --- | --- | --- |
| bulk modulus | Pa | $22 \cdot 10^9$ | $7 \cdot 10^9$ |
| density | kg/m$^3$ | 2300 | 1900 |
| conductivity | S/m | 0.01 | 1.00 |
| Skempton coefficient |  | 0.65 | 0.85 |
| permeability | m$^2$ | $10^{-12}$ | $10^{-16}$ |

Figure 2D:
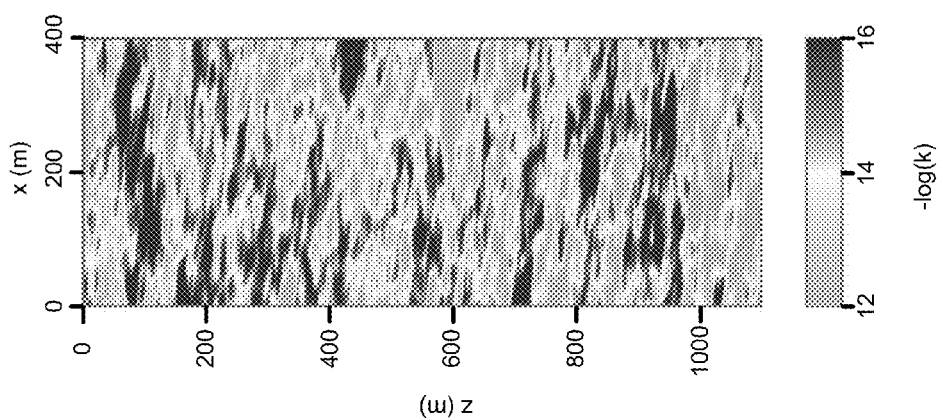
Figure 2C:
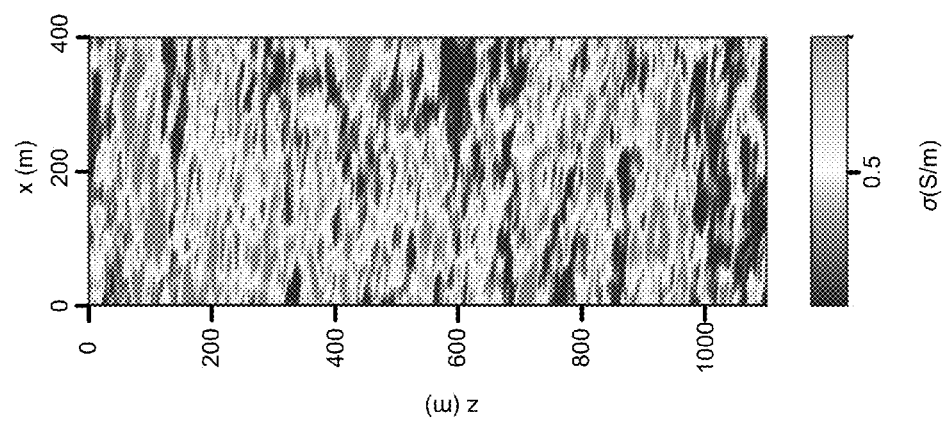
Figure 4:
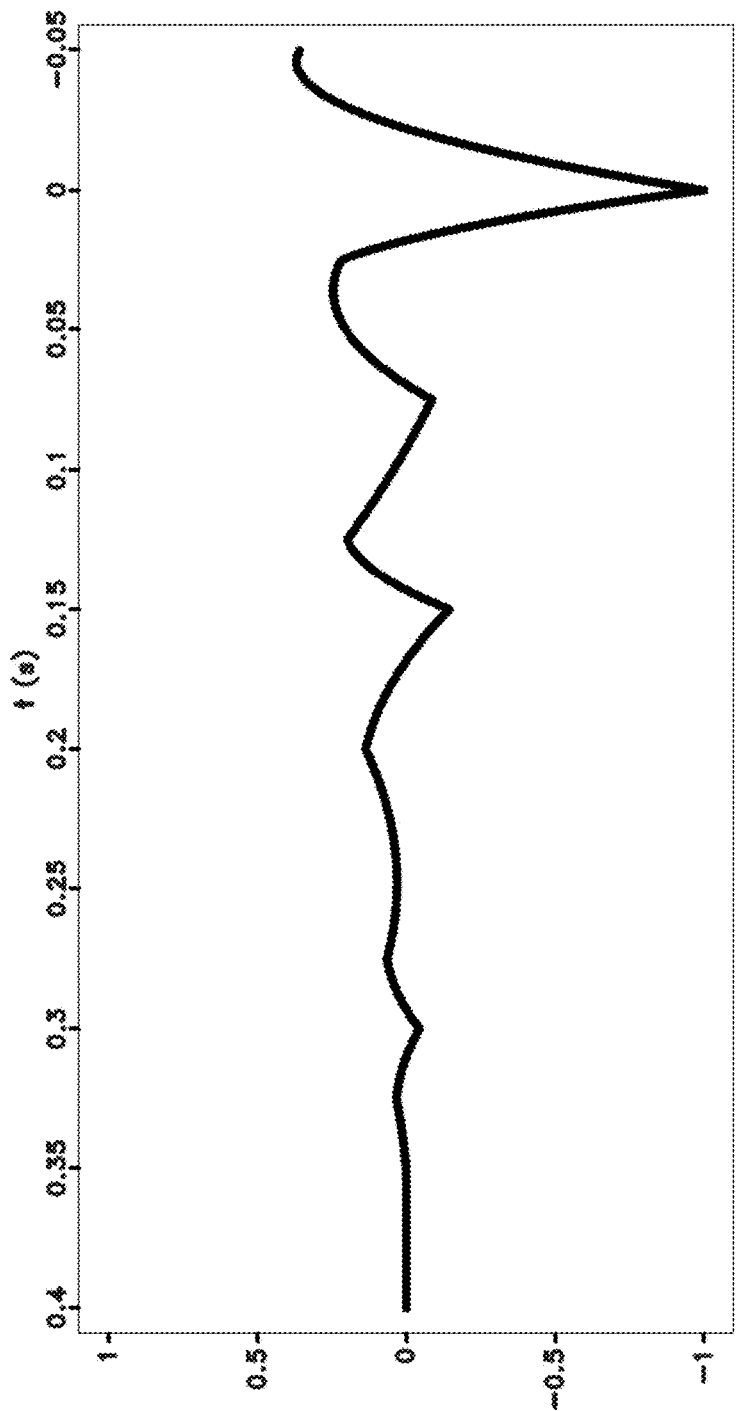
FIG. 4 depicts a normalized electric potential as a function of time at coordinates $\{x,z\}=\{50, 600\}$ m; the plot illustrates the significantly stronger electric potential that is achieved when the wavefield is focused at a single location in the medium in accordance with embodiments of the present disclosure.
Figures 5C, 5D:
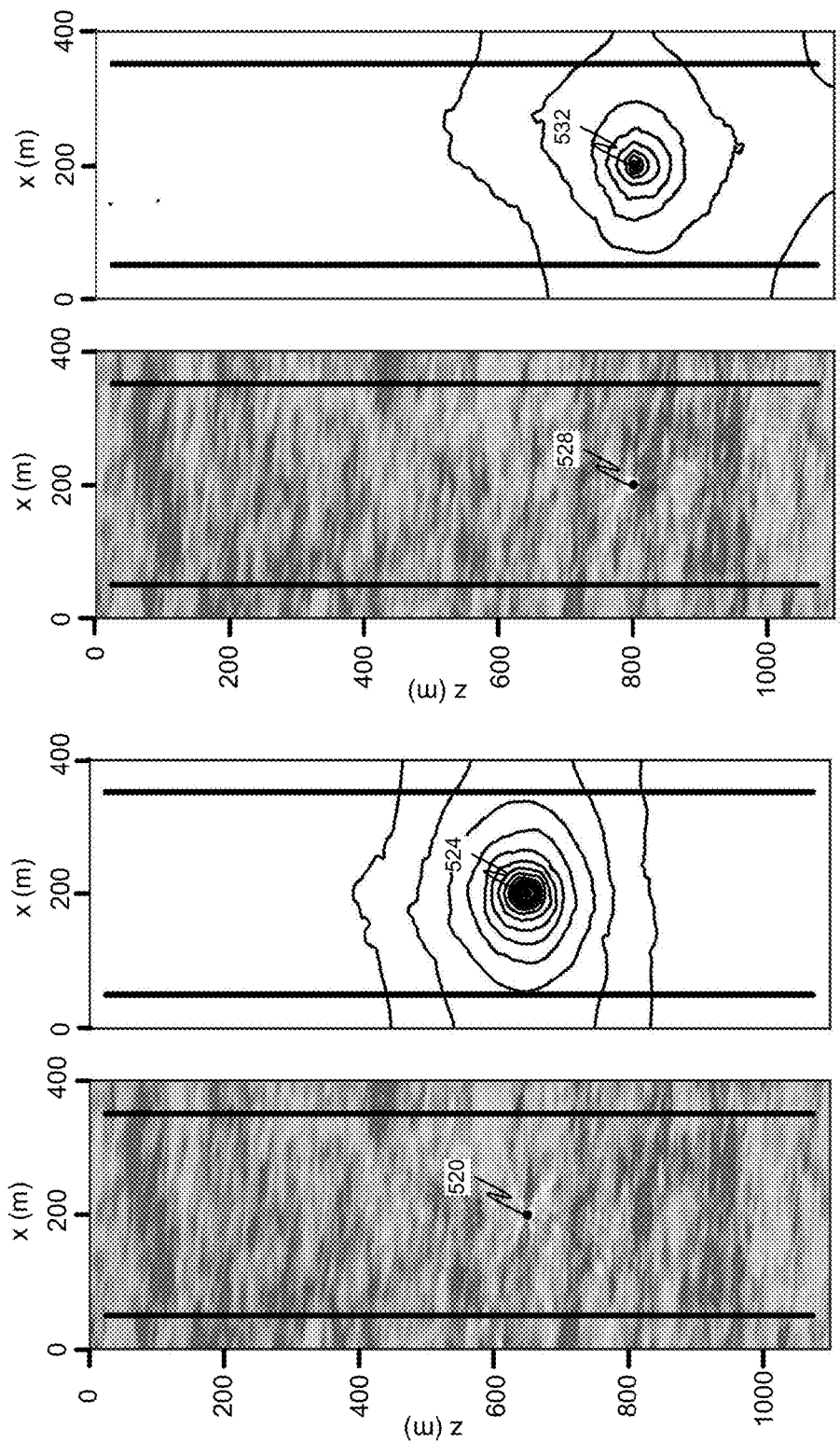
Figure 6:
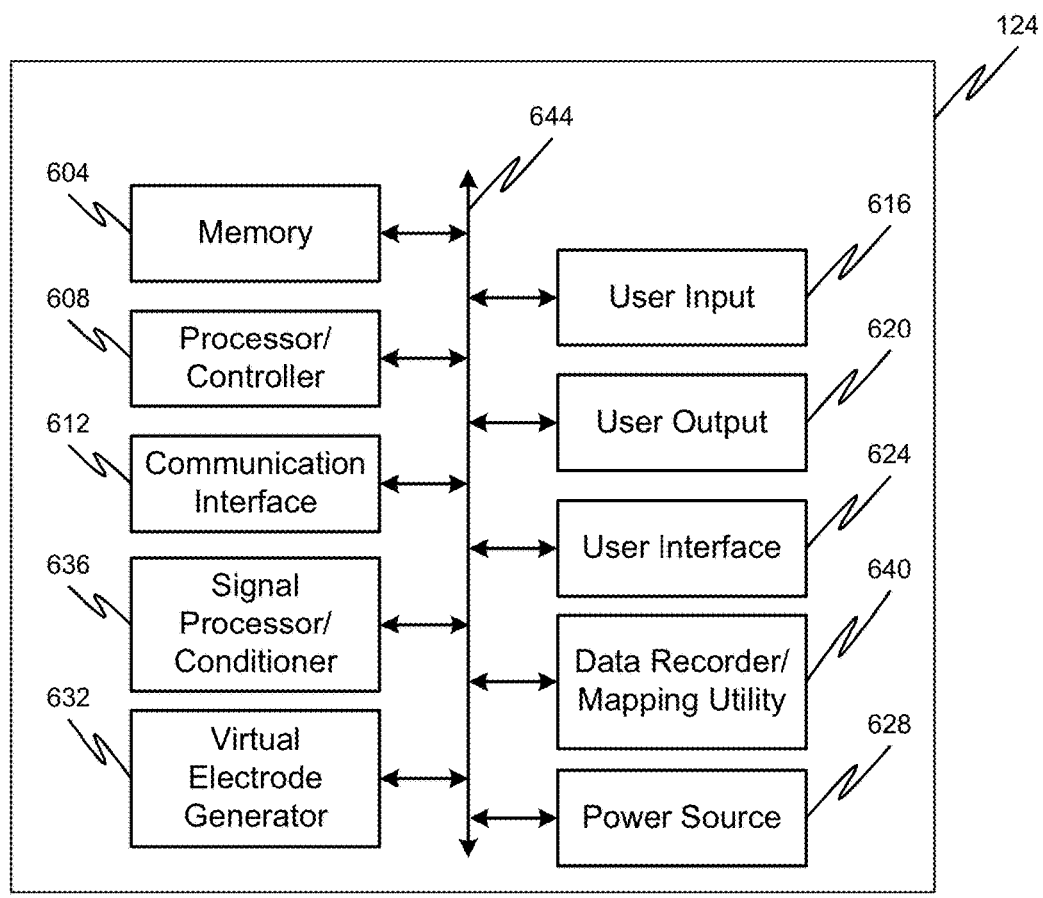
FIG. 6 depicts block diagram comprising one or more components of a virtual electrode generator/imaging unit in accordance with embodiments of the present disclosure.

In accordance with at least some embodiments, a first example represented by a heterogeneous earth model characterized by the velocity, density, conductivity and permeability is depicted in FIGS. 2A-2D. For example, an earth model roughly 400 meters wide and over 1000 meters deep is assumed having velocity characteristics as depicted in FIG. 2A. The same earth model may also have density characteristics as depicted in FIG. 2B. Additionally, the same earth model may have conductivity and permeability characteristics as depicted in FIGS. 3C-D respectively. Using 525 acoustic sensors located in each of the boreholes located at x=50 m and x=350 m, acoustic waves phased appropriately to focus at the target point at a known time, arbitrarily chosen as t=0 s, are back-propagated. Accordingly, a virtual seismoelectric electrode may be positioned at location $\{x, z\}=\{200, 650\}$ meters of the earth model as depicted in FIGS. 3A-D. The left panels in FIGS. 3A-D illustrate wavefields focusing toward a virtual electrode location 304, 312, 320 and 328 respectively. The right panels of the same figures illustrate the electric potential as a function of space at the respective time. As depicted in FIGS. 3A-3C, the seismoelectric conversions occur throughout the medium at times corresponding to 304, 312, and 320 respectively, but with relatively low intensity corresponding to the distribution of the acoustic field. At the focus time 328 depicted in FIG. 3D, the electric potential 332 is strongest relative to all other times 308, 316, and 324. This change of potential may then be observed at the electrodes, as depicted in the right panels of FIGS. 3A-D. As further depicted in FIGS. 3A-D, virtual electrodes may be simulated having a strength, position and time of occurrence controlled via a remote seismic array, for example, an array of seismic sources 116A-G. Furthermore, as depicted in FIG. 4, the strength of the electric potential is significantly larger when the wavefield is focused at a single location, relative to the times when the wavefield is spread-out in the medium, as depicted at time of t=0 corresponding to the focus time depicted in FIG. 3D.

As another example, and in accordance with embodiments of the present disclosure, another feature is illustrated using a similar type of seismic array. That is, the acoustic energy at different locations in the medium is focused, thus probing the existence of contrasts of hydroelectric properties that facilitates seismoelectric conversions. For example, FIGS. 5A-D depict the acoustic field, spatially-dependent electric potential and observed electric potential for different virtual electrodes 508, 516, 524, and 532 in the medium. All panels in FIGS. 5A-D correspond to the focusing time at which point the strongest electric potential is observed. As observed in FIGS. 5A-D, the electric potential corresponding to locations 508, 516, 524, and 532 changes significantly with position due to the different medium parameters at the position of the virtual electrode. For example, at a focusing position corresponding to a location of 504, the corresponding electric potential at virtual electrode 508 is depicted. However, by adjusting the position, a focusing position corresponding to a location of 512 does not provide the same electric potential at a virtual electrode 516. Similarly, the electric potential generated at virtual electrode 524 and 532 corresponding to focusing positions 520 and 528 respectively, vary with position. This example demonstrates that the position of the virtual electrode may be controlled and that the strength of the observed electric potential depends on the medium parameters at the virtual electrode position.

Moreover, referring again to FIG. 1, a three-dimensional grid 136 may be established having identified locations 140A-N of which a virtual electrode is to be positioned. As one example, the seismic sources 116A-G may be focused such that a virtual electrode is located at position 140A. Accordingly, once the electric potential of the seismoelectric conversion occurring at position 140A has been measured by one or more seismic sensors 120A-F, the seismic sources 116A-G may be focused such that a virtual electrode is located at position 140B. Accordingly, electric potentials at locations 140A-N may be obtained such that characteristics of an area 132 are obtained. Alternatively, or in addition, a single seismic source 116 may be utilized; that is, multiple seismic or acoustic signals may be propagated at different times throughout a surveying process; the data recorded or otherwise measured by the seismic sensors 116A-F may be later combined and processed such that characteristics of a particular medium may be determined.

The methodology described above may further serve as the basis for electrical resistivity tomography with controlled virtual sources constructed at known locations and times. For example, assuming that the conductivity in the medium is known, the parameters of an electrical source at a known position and time can be determined. If the source is positioned at the interface between permeable and impermeable materials, then the inverted source may provide information about the permeability of the medium. This setup can be used to monitor fluid flow and fluid composition. Additionally, assuming that hydraulic properties at a certain location in the medium are known, the electrical conductivity characterizing the space between the virtual electrode and the real electrodes located in nearby boreholes may be determined. That is, an arbitrary number of virtual electrodes throughout the medium may be simulated, increasing the resolution and robustness of electric tomography.

In general however, the issue of determining the parameters of the electrical source and determining the electrical conductivity characterizing the space between the virtual electrode and the real electrodes are not separate issues; that is, the inverse problem would need to incorporate both. One possibility to address this problem is by iterating between determining the parameters of the electrical source and determining the electrical conductivity characterizing the space between the virtual electrode and the real electrodes. Moreover, electrical resistivity tomography may be cast as a four dimensional problem where the acoustic wavefield is used at all times as a time-variable source investigating the same model controlled by invariant parameters.

Additionally, we note that focusing seismic energy may be simulated computationally through techniques like seismic interferometry. This approach may also be used for interferometric Green's function representations of coupled electromagnetic and seismic wave propagation. Here a different approach is pursued and is directed at physical focusing achieved in a medium of known acoustic properties in order to evaluate the electric properties in its vicinity. Accordingly, the present approach provides direct access to seismoelectric sources excited in the medium.

As provided in the above description, virtual electrodes may be simulated at known positions and times in a heterogeneous medium. This is achieved by focusing acoustic waves at specified coordinates from multiple acoustic receivers located in the vicinity of a target. The acoustic energy at the focused time is largest relative to all other times, thus insuring the strongest possible seismoelectric source at the target position. This methodology may be used to investigate the electric and hydraulic properties of a medium by surrounding the area of investigation with multiple electrodes, or seismic sensors 120A-F, at known positions. The dense virtual electrode distribution has the potential to increase the robustness and to improve the resolution of electrical resistivity tomography. This methodology may also be employed to infer hydraulic parameters, e.g. permeability, through a controlled seismoelectric procedure.

Alternatively, or in addition, by repositioning the virtual electrode, heterogeneities may be imaged without performing resistivity tomography. For example, a single electrode at the ground surface 104 or in a borehole 112 may record an electrical potential for each instance of seismic energy that is focused at each point of a set of points located on a grid covering a region of the subsurface. For instance, seismic sources 116A-G may focus seismic energy at a set of points 140A-N located on a grid 136 covering a region 132 of the subsurface 108. A map comprising of all the measured potentials at a fixed electrode for foci at many locations covering a region of the subsurface (corrected for the distance between the scanning point and the position of the electrode) may be used to characterize the medium heterogeneities. Because the seismoelectric coupling between the seismic energy and the electromagnetic energy is sensitive to water and oil saturations, such an approach may be used in a time lapse sense to image contrasts that would be associated with a change in saturation only. For example, such a process may be used to monitor contact between hydrocarbons and water during enhanced oil recovery operations in the field. Alternatively, or in addition, such an approach may be used to measure a change in salinity, a change in porosity, and/or a change in permeability over time. That is, single snapshots and/or a sequence of snapshots of an area of interest may be obtained to monitor dynamic processes, such as changes in saturations in rocks.

Alternatively, or in addition, the method may be used in a spectroscopic sense. That is, in some embodiments, a focused pulse may be provided at each focus point 140A-N. Instead of sending a single pulse to each of the focus points, the location specified by the focus point may be subjected to a range of frequencies to obtain a frequency response for a particular location. That is, a generated electrical potential resulting from a seismoelectric conversion may be measured and/or recorded over a range of frequencies. In presence of fractures and cracks, we expect characteristic responses in the form of a resonance peak in the electrical potential versus frequency which may be observed. In accordance with at least one embodiment, observing characteristic changes in the electrical potential over a range of frequencies may be used to not only locate sweet spots that maximize production of unconventional reservoirs (oil and gas shale plays), but may also be used in conventional oil and gas reservoirs to identify high permeability targets. Stated another way, if the source function is sinusoidal at a given frequency, a set of points in the subsurface may vibrate for a range of frequencies. In turn, the magnitude of the electrical field and/or electric potential versus frequency may provide an indication of the presence of cracks and fractures. Such cracks and/or fractures may be used to locate and/or identify geographical targets of interest.

FIG. 4 illustrates a block diagram depicting one or more components of the virtual electrode generator/image unit 124 in accordance with at least some embodiments of the present disclosure. In some embodiments, the virtual electrode generator/image unit 124 may include a processor/controller 608 capable of executing program instructions. The processor/controller 608 may include any general purpose programmable processor or controller for executing application programming. Alternatively, or in addition, the processor/controller 608 may comprise an application specific integrated circuit (ASIC). The processor/controller 608 generally functions to execute programming code that implements various functions performed by the virtual electrode generator/image unit 124. The processor/controller 608 of the virtual electrode generator/image unit 124 may operate to control a seismic (acoustic) source and further control a signal detected by a seismic sensor.

The virtual electrode generator/image unit 124 may additionally include memory 604. The memory 604 may be used in connection with the execution of programming instructions by the processor/controller 612, and for the temporary or long term storage of data and/or program instructions. For example, the processor/controller 612, in conjunction with the memory 604 of the virtual electrode generator/image unit 124, may implement data recording, signal analysis, signal generation, application, and web services that are needed and accessed by one or more seismic sources 116A-G and/or seismic sensors 120A-F.

The memory 604 of the virtual electrode generator/image unit 124 may comprise solid state memory that is resident, removable and/or remote in nature, such as DRAM and SDRAM. Moreover, the memory 604 may comprise a plurality of discrete components of different types and/or a plurality of logical partitions. In accordance with still other embodiments, the memory 604 comprises a non-transitory computer readable storage medium. Such a medium may take many forms, including but not limited to, non-volatile media, volatile media, and transmission media.

The virtual electrode generator/image unit 124 may further include a communication interface 612, signal processor/condition 636, virtual electrode generator 632, user input 616, user output 620, user interface 624, data recorder 640, and power source 628. The communication interface 612 may comprise a GSM, CDMA, FDMA and/or analog cellular telephony transceiver capable of supporting voice, multimedia and/or data transfers over a cellular network. One or more components of the virtual electrode generator/image unit 124 may communicate with another utilizing a communications bus 644. Alternatively, or in addition, the communication interface 612 may comprise a Wi-Fi, BLUETOOTH™, WiMax, infrared, NFC or other wireless communications link. The communication interface 612 may be associated with one or more shared or a dedicated antennas. The type of medium used by the virtual electrode generator/image unit 124 to communicate with other communication devices, may depend upon the communication applications availability on the virtual electrode generator/image unit 124 and/or the availability of the communication medium.

The virtual electrode generator/image unit 124 may optionally include a user interface 624 allowing a user to interact with the virtual electrode generator/image unit 124. For example, the user may be able to enter and/or select one or more acoustic functions to be generated, one or more frequencies to be utilized, and or position or identify one or more virtual electrode locations, such as 140A-N. Moreover, the user may interact with the user interface 624 to configure one or parameters of the virtual electrode generator/image unit 124, operate or otherwise interact with one or more applications running on the virtual electrode generator/image unit 124, and configure one or more operating profiles. Examples of user input devices 616 include a keyboard, a numeric keypad, a touch screen, a microphone, scanner, and pointing device combined with a screen or other position encoder. Examples of user output devices 620 include a display, a touch screen display, a speaker, and a printer.

The signal processor/conditioner 636 may contain the necessary components and functionality to filter, condition, and/or process a signal received from a seismic sensor 120A-F. The signal processor/conditioner 636 may be operable to perform the following non-limiting functions: analog to digital conversion, digital signal processing, signal filtering and/or isolation, and data conversions. The virtual electrode generator 632 may contain the necessary components and/or functionality to control and/or otherwise cause the seismic sources 116A-G to focus seismic energy at one or more locations, such as location 140A (140A-N) for example. In particular, the virtual electrode generator 632 may receive data, parameters, signals, and/or combinations thereof which direct or otherwise cause the virtual electrode generator 632 to alter an activation signal and/or source function before, after, or during the generation of a virtual electrode utilizing a seismoelectric conversion. As one example, the virtual electrode generator 632 may alter a source function phase in response to receiving one or more signals from the signal processor/condition 636; accordingly, the source function to be applied by one or more seismic sources 116A-G may be altered such that a signal generated by the seismic source 116 is focused at an identified location and at an identified time.

The Data Recorder/Mapping Utility 640 may comprise one or more storage areas for storing the raw and/or processed signal obtained from the signal processor/conditioner 636. Alternatively, or in addition, the Data Recorder/Mapping Utility 640 may additionally map the signals received from the signal processor/conditioner 636 such that a map including a location of seismic sources, a location of the virtual electrode, a location of the seismic sensors, and characteristics of an imaged medium may be displayed to a user.

Figure 7:
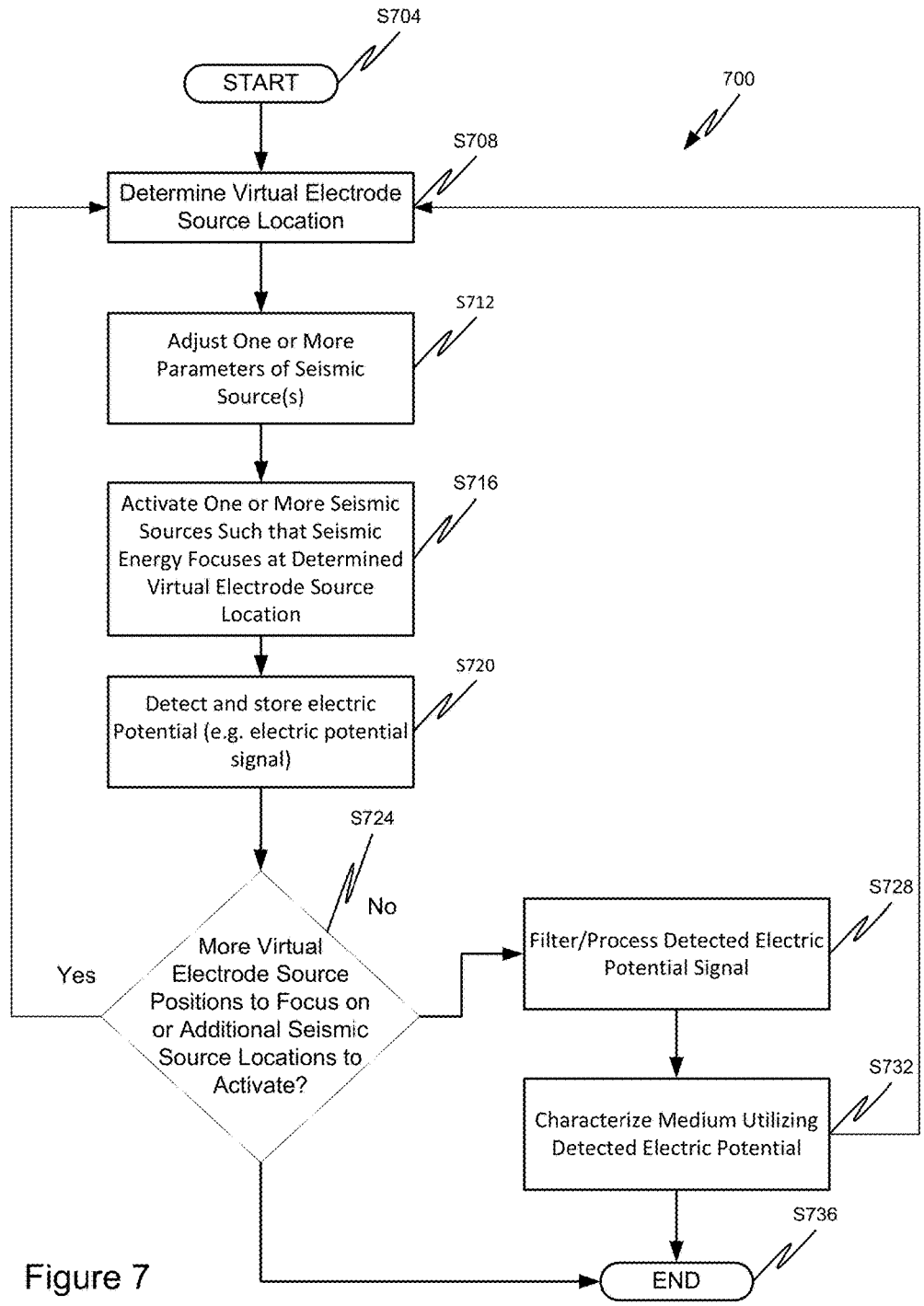
FIG. 7 depicts a method in accordance with embodiments of the present disclosure.

Referring now to FIG. 7, a method 700 of determining subsurface characteristics of a homogeneous medium utilizing one or more virtual electrodes will be discussed in accordance with embodiments of the present disclosure. Method 700 is in embodiments, performed by a device, such as a virtual electrode generator/imaging unit 124. More specifically, one or more hardware and software components may be involved in performing method 700. In one embodiment, one or more of the previously described modules and/or devices perform one or more of the steps of method 700. The method 700 may be executed as a set of computer-executable instructions executed by a computer system implementing the virtual electrode generator/imaging unit 124 encoded or stored on a computer-readable medium. Hereinafter, the method 700 shall be explained with reference to systems, components, modules, software, etc. described with FIGS. 1-6.

Method 700 may continuously flow in a loop, flow according to a timed event, or flow according to a change in an operating or status parameter. Method 700 is initiated at step S704. Method 700 may then proceed to step S708 where a location of a virtual electrode is determined. For example, the virtual electrode may be placed at one or more locations 140A-N such than an area 132 may be imaged. Accordingly, if the virtual electrode is to be placed at more than one locations 140A-N, then the determination at step S708 may be according to a predetermined map or route. Once the location of the virtual electrode is determined at step S708, the method 700 flows to step S712 where one or more parameters of the seismic source(s) 116A-G are adjusted. Accordingly, one or more phases and/or source functions may be adjusted at step S712 such that the virtual electrode is placed at a known location and at a known time. Method 700 then proceeds to step S716 where the one or more seismic sources are activated such that seismic energy is focused at the virtual electrode location that was determined in step S712. That is, as previously described, the seismic energy provided by the one or more seismic sources 116A-G is focused at a predetermined location. A seismoelectric conversion may then occur at the location in which the seismic energy activated in step S716 is focused upon. Accordingly, method 700 proceeds to step S720 where, as previously described, the electric potential resulting from the seismoelectric conversion is detected at one or more seismic sensors 120A-F. The detected electric potential may then be stored at for example, the data recorder 640.

At step S724, method 700 determines whether there are either additional virtual electrode positions of which seismic energy needs to be focused upon. For example, additional locations 140A-N may be utilized to image an area of interest 132. In such an instance, method 700 may return to step S708 where the next virtual electrode position is determined. Alternatively, or in addition at step S724, in instances where a single seismic source 116 is utilized, and the seismic source 116 provides additional seismic energy from other locations for the same virtual electrode position, method 700 may return to step S708 to undergo additional seismic shots. If no additional seismic energy is required, method 700 may then proceed to step S728 where the detected electric potential may optionally be filtered and/or processed. Method 728 may then proceed to step S732 where the medium may be characterized utilizing the detected, filtered, and/or processed electric potential signal.

For example, the mapping utility 640 may map or otherwise render a display illustrating porosity, salinity, permeability and/or other fluid/medium characteristics. In addition, the detected, filtered, and/or processed electric potential signal may also be used to add additional information to an electrical resistivity tomography imaging process at step S723. The method 700 may then end at step S736.

Alternatively, or in addition, method 700 may repeat the imaging process according to a lapse of time. For example, after a day, a week, a month, and/or a year passes, the same process at the same location may repeat. Thus, in instances where method 700 acquired characteristics utilizing three-dimensional virtual electrode source positions, a fourth dimension, namely that of time, may be recorded to identify changes or progressions in characteristics.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software. Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function. Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for controlling a seismoelectric conversion comprising:
   determining a virtual electrode source location within a medium;
   focusing a plurality of seismic waves, from one or more seismic sources, at the virtual electrode source location within the medium; and
   causing the plurality of seismic waves from the one or more seismic sources to propagate through the medium and accumulate at the virtual electrode source location within the medium, wherein an intensity of the seismoelectric conversion occurring at the virtual electrode source location after focusing is greater than an intensity of the seismoelectric conversion occurring at the virtual electrode source location prior to focusing.

2. The method of claim 1, further comprising:
   phase delaying the plurality of seismic waves such that the plurality of seismic waves propagating through the medium accumulate at a known time and at the virtual electrode source location.

3. The method of claim 2, further comprising:
   characterizing an electrical conductivity of a medium between the virtual electrode source location having an increased seismoelectric conversion and an electrode.

4. The method of claim 3, further comprising:
   imaging heterogeneities of the medium utilizing electrical resistive tomography based on the characterization of the electrical conductivity of the medium between the virtual electrode source location having the increased seismolelecric conversion and the electrode.

5. The method of claim 2, wherein an intensity of the seismoelectric conversion changes based on spatial properties of the medium.

6. The method of claim 2, further comprising:
   determining the virtual electrode source location at an interface between permeable and impermeable materials; and
   measuring an electrical field emanating from the seismoelectric conversion occurring at the virtual electrode source location.

7. The method of claim 2, further comprising:
   focusing a second plurality of seismic waves at the virtual electrode source location; and
   causing the second plurality of seismic waves to propagate through the medium and accumulate at the virtual electrode source location within the medium, wherein an intensity of the seismoelectric conversion occurring at the virtual electrode source location after focusing the second plurality of seismic waves is greater than an intensity of the seismoelectric conversion occurring at the virtual electrode source location prior to focusing the second plurality of seismic waves.

8. The method of claim 1, wherein the plurality of seismic waves is initiated from an array of synchronized seismic sources.

9. The method of claim 8, wherein the seismic sources have different source functions.

10. A non-transitory computer-readable medium configured to perform the method according to claim 1.

11. The method of claim 1, further comprising:
spatially focusing the plurality of seismic waves at the virtual electrode source location within the medium; and
phase delaying the plurality of seismic waves such that the plurality of seismic waves propagating through the medium accumulate at the virtual electrode source location and at a known time,
wherein an intensity of an observed electric potential resulting from the seismoelectric conversion occurring at the virtual electrode source location within the medium and at the known time after phase delaying the plurality of seismic waves is greater than an intensity of an electric potential resulting from the seismoelectric conversion occurring at the virtual electrode source location prior to phase delaying the plurality of seismic waves.

12. The method of claim 11, wherein the one or more seismic sources have different source functions.

13. The method of claim 11, further comprising:
initiating the plurality of seismic waves from an array of synchronized sources.

* * * * *